US012663115B2

(12) United States Patent (10) Patent No.: US 12,663,115 B2
Wu (45) Date of Patent: Jun. 23, 2026

(54) WALL-HANGING HOUSING FOR ELECTRONIC DEVICE

(71) Applicant: ACCTON TECHNOLOGY CORPORATION, Hsinchu (TW)

(72) Inventor: Chien-Hua Wu, Miaoli County (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 188 days.

(21) Appl. No.: 18/653,992

(22) Filed: May 3, 2024

(65) Prior Publication Data

US 2025/0189073 A1 Jun. 12, 2025

(30) Foreign Application Priority Data

Dec. 12, 2023 (CN) .......................... 202323385528.9

(51) Int. Cl.
F16M 13/02 (2006.01)
(52) U.S. Cl.
CPC .................................. F16M 13/02 (2013.01)
(58) Field of Classification Search
CPC ................................ F16M 13/02; H02G 3/14

USPC .......................................................... 174/50
See application file for complete search history.

(56) References Cited

U.S. PATENT DOCUMENTS

2017/0363251 A1* 12/2017 Porter .................. F16M 13/022

* cited by examiner

*Primary Examiner* — Timothy J Thompson
*Assistant Examiner* — Guillermo J Egoavil
(74) *Attorney, Agent, or Firm* — Apex Juris, pllc; Hilde M. L. Coeckx

(57) ABSTRACT

A wall-hanging housing for an electronic device includes a box body including a front board and a back board that face each other. Two opposite sides of the back board respectively have a front surface facing the front board and a back surface away from the front board. The back surface is dented toward the front surface to form a housing room. A part of the front surface corresponding to the housing room is connected to a convex portion. A tail end of the convex portion extends toward the front board or toward the electrical component. The housing room could be fitted in by a wall-hung protrusion for fixing the box body. The at least one convex portion is adapted to be combined with the front board and the back board or be a channel allowing an outside plug to insert into the electrical component.

7 Claims, 12 Drawing Sheets

WALL-HANGING HOUSING FOR ELECTRONIC DEVICE

BACKGROUND OF THE INVENTION

Technical Field

The present disclosure relates generally to a wall-hanging housing for an electronic device, and more particularly to a wall-hanging housing for an electronic device with a back wall-hanging structure integrating a housing room and a convex portion and thereby having a compound function.

Description of Related Art

Generally, a conventional wall-hanging housing for an electronic device or a conventional electronic product, which hangs on a wall, in the market is provided with a plurality of hanging openings for hanging on a plurality of support hooks and a plurality of U-shaped dents for hanging on a plurality of screw heads. Such hanging openings and U-shaped dents are provided in different locations of a back surface of a box body; to combine a front cover of the box body with a back board of the box body, a plurality of screw holes corresponding to a plurality of screws are also disposed on the back board, so that the screws penetrate through the screw holes to be screwed into the front cover, thereby fixing the front cover and the back board.

As the hanging openings, the U-shaped dents, and the screw holes are respectively disposed in different locations of the back board of the conventional box body, an area of the back board occupied by the aforementioned components is great and the back board has a dented shape and a convex shape in different locations of the back board. As a result, an area of the back board, which could be disposed with a cooling fin, is reduced. Because a mold required in injection molding is more complicated, a production cost is higher. Additionally, each of the hanging openings, each of the U-shaped dents, and each of the screw holes only have a single function and the locations for hanging and screwing are different, so that aligning is not easy as assembling the conventional wall-hanging housing for the electronic device, thereby causing inconvenience in using the conventional wall-hanging housing for the electronic device.

BRIEF SUMMARY OF THE INVENTION

In view of the above, the primary objective of the present disclosure is to provide a wall-hanging housing for an electronic device, wherein a housing room and a convex portion are respectively formed on two opposite sides of a back board of the wall-hanging housing, so that the housing room could be fitted in by a wall-hung protrusion, thereby disposing a box body of the wall-hanging housing on a wall surface or a location for fixing; the convex portion could be used to fix a front board and the back board or to provide a connecting port for being inserted by a plug and being electrically connected to an electrical component, which provides a function of detecting a circuit of the electrical component, according to a configuration of the convex portion.

The present disclosure provides a wall-hanging housing for an electronic device, including a front board and a back board that face each other; a side of the back board facing the front board has a front surface and another side of the back board away from the front board has a back surface; the back surface is dented in a direction of the front surface to form at least one housing room; a part of the front surface corresponding to the at least one housing room is connected to at least one convex portion; the at least one convex portion extends in a direction of the front board.

In an embodiment, an electrical component is installed in the box body formed by the front board and the back board; the at least one convex portion is adapted to be combined with the front board or the electrical component.

In an embodiment, an electrical component is installed in the box body formed by the front board and the back board; the at least one convex portion includes a rectangular tube body, wherein the rectangular tube body has an opening; an inner portion of the rectangular tube body communicates with the at least one housing room; a connecting port corresponding to the rectangular tube body is disposed on the electrical component; the opening of the rectangular tube body faces the connecting port.

In an embodiment, the at least one convex portion includes a circular tube body; the circular tube body has a tail end; a center of the tail end has a through hole; a screw penetrates through the through hole; a screw hole matching with the screw is disposed on the front board or on the electrical component; the screw is screwed with the screw hole of the front board or with the screw hole of the electrical component.

In an embodiment, the at least one convex portion includes a rod body; the rod body has a fixing buckle; a buckling hole matching with the fixing buckle is disposed on the front board or on the electrical component; the fixing buckle is buckled in the buckling hole of the front board or in the buckling hole of the electrical component.

In an embodiment, the at least one housing room has a peripheral wall; at least one side of the peripheral wall has a hanging opening; a dent corresponding to the hanging opening of the at least one side of the peripheral wall is formed on a side of a peripheral edge of the at least one housing room; a part of the hanging opening, which is connected to the front surface, of the at least one side of the peripheral wall is connected to a blocking sheet, wherein the blocking sheet and the dent face each other.

In an embodiment, the at least one housing room is at least one rectangular recess and has a peripheral wall, wherein the peripheral wall is a surface surrounding as a rectangle.

In an embodiment, the at least one housing room includes a long trench extending in a straight-line direction and having an inner wall; a side of the inner wall has a hanging opening; a dent corresponding to the hanging opening is formed on a side of a back edge of the long trench; a part of the hanging opening connected to the front surface is connected to a blocking sheet, wherein the blocking sheet and the dent face each other; a part of the inner wall connected to the back surface is connected to a convex sheet.

With the aforementioned design, as the housing room and the convex portion that provide a compound function are provided in the same location, the area of the back board occupied by the housing room and the convex portion could be reduced, so that the cooling fin could be formed by the back board with a greater area for cooling. Because a structure of the back board is simplified as producing the back board, a cost of the mold and a cost of the materials could be reduced. As the housing room and the convex portion that provide the compound function are provided in the same location, the location of the convex portion could be easily identified from the location of the housing room. When the front board is combined with the back board through the convex portion, the location in which the convex portion is screwed with or buckled in the front board could be easily found, thereby saving an installing time.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1A:
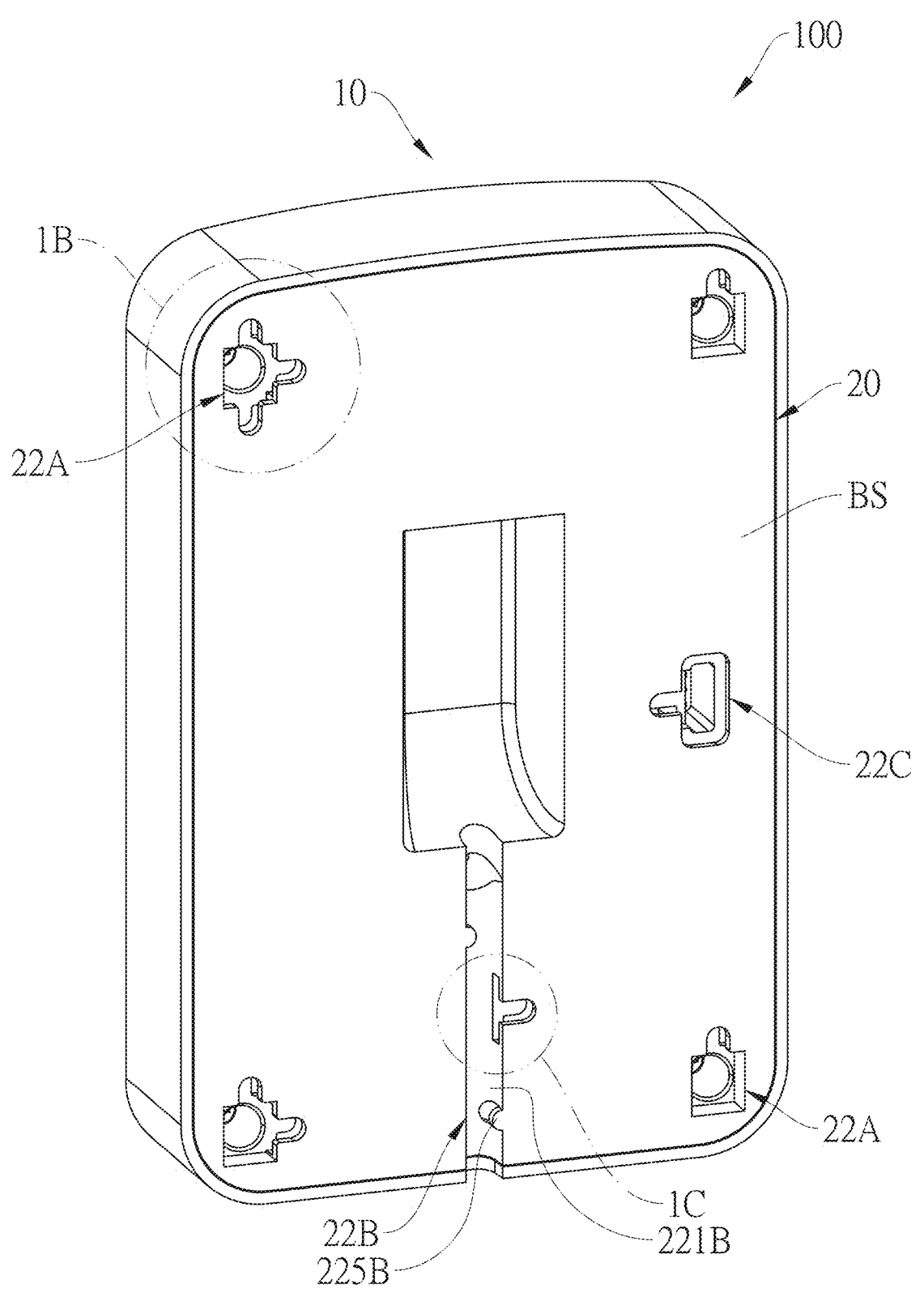
FIG. 1A is a perspective view of the wall-hanging housing for the electronic device according to an embodiment of the present disclosure.

A wall-hanging housing 100 for an electronic device according to an embodiment of the present disclosure is illustrated in FIG. 1A to FIG. 2B and includes a box body 10 and an electrical component 30 installed in the wall-hanging housing 100.

The box body 10 is a rectangular shell body and is formed by a front cover 12 and a back board 20, wherein the front cover 12 has a front board 121 and an annular board 122 connected to a peripheral edge of the front board 121. An end edge of the annular board 122 forms a front cover opening 123. The back board 20 covers the front cover opening 123 of the front cover 12. The front board 121 and the back board 20 face each other. A side of the back board 20 facing the front board 121 has a front surface FS. Another side of the back board 20 opposite to the front surface FS and the front board 121 has a back surface BS. The electrical component 30 is disposed inside the front cover 12 and has a circuit board 32, wherein the circuit board 32 of the electrical component 30 is located inside the box body 10 formed by the front board 121 and the back board 20.

Figure 1B:
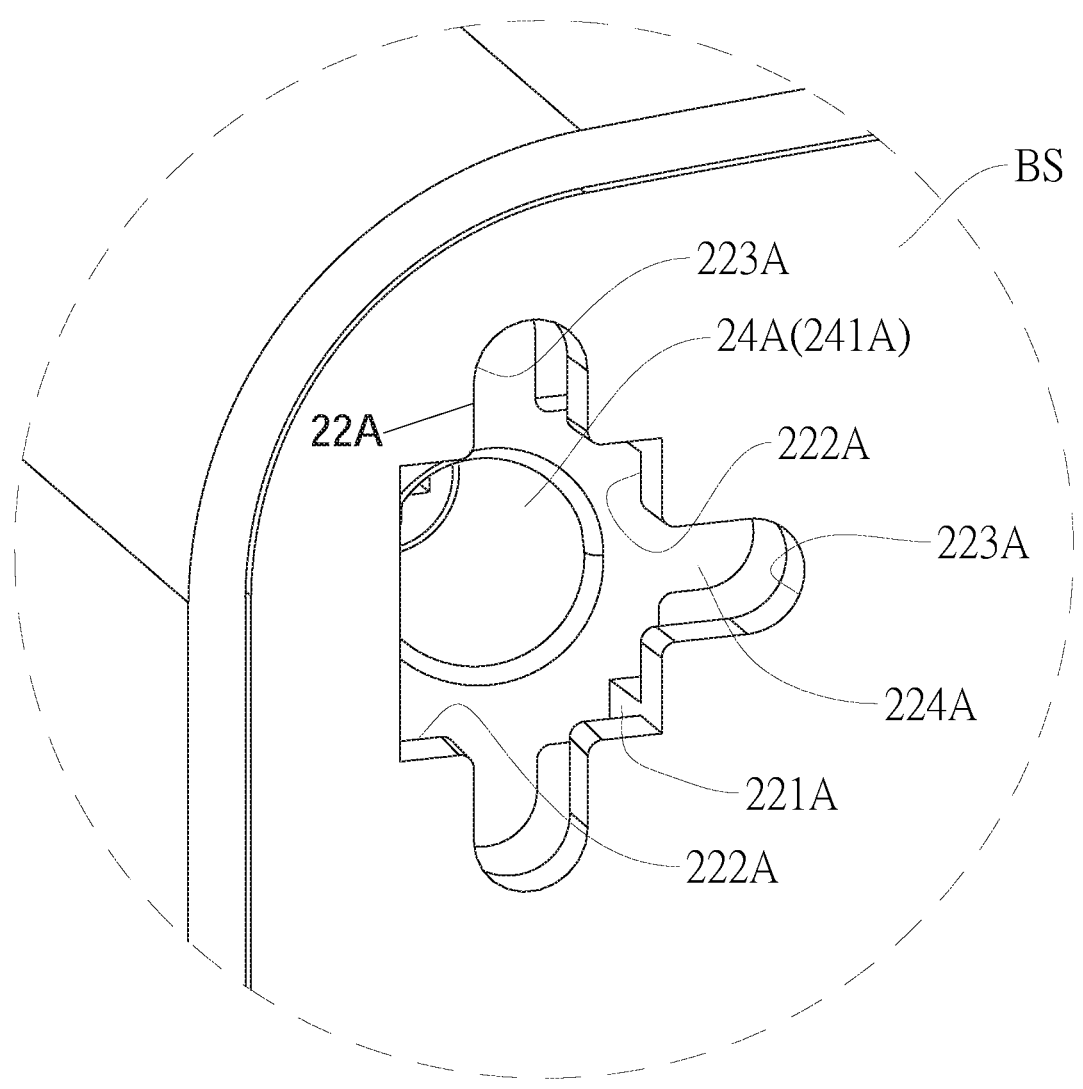
FIG. 1B is an enlarged view of a marked region 1B in FIG. 1A.

The back surface BS of the back board 20 is dented in a direction of the front surface FS to form three kinds of housing rooms 22A, 22B, 22C. Referring to FIG. 1A and FIG. 1B, the housing rooms 22A are formed in four corners of the back surface BS. Each of the housing rooms 22A is a rectangular recess having four sides, but not limited thereto. A periphery of each of the housing rooms 22A has a peripheral wall 221A, wherein the peripheral wall 221A is a surface surrounding as a rectangle. The peripheral walls 221A of the housing rooms 22A respectively have at least one hanging opening 222A around the peripheral walls 221A. In the below description, one housing room 22A having three hanging openings 222A are illustrated as an example.

The housing room 22A has the three hanging openings 222A respectively located on three sides of the peripheral wall 221A, wherein each of the hanging openings 222A could hang on a support hook. Each of the hanging openings 222A forms a dent 223A on a side of a peripheral edge of the housing room 22A. In the current embodiment, each of the dents 223A is U-shaped, wherein a width of each of the dents 223A is less than a length of each of the sides of the housing room 22A. A part of each of the hanging openings 222A connected to the front surface FS is connected to a blocking sheet 224A, wherein each of the blocking sheets 224A and each of the dents 223A face each other. In this way, each of the dents 223A could hang on a screw head.

Referring to FIG. 1B and FIG. 2A to FIG. 4, a part of the front surface FS of the back board 20 corresponding to each of the housing rooms 22A is connected to a convex portion 24A. Each of the convex portions 24A extends in a direction of the front board 121 and the circuit board 32 of the electrical component 30. In the current embodiment, each of the convex portions 24A is combined with the front board 121 and the circuit board 32 of the electrical component 30. More specifically, in the current embodiment, each of the convex portions 24A is a circular tube body 241A, wherein each of the circular tube bodies 241A has a tail end 242A. A center of each of the tail ends 242A has a through hole 243A. A plurality of screws 26A respectively penetrate through the through holes 243A of the convex portions 24A. A plurality of screw holes 14 matching with the screws 26A is disposed on a side of the front board 121 facing the back board 20. A plurality of through holes 34 is disposed on the circuit board 32 of the electrical component 30. Each of the screws 26A penetrates through each of the through holes 34 of the circuit board 32 and thereby is screwed with each of the screw holes 14 of the front board 121. In this way, the front board 121 and the back board 20 could be fixed and the circuit board 32 of the electrical component 30 could be fixed between the front board 121 and the back board 20. In other embodiments, the front cover 12 could be replaced with the front board 121; similarly, through the screws 26A screwed with each of the screw holes 14 of the front board 121, the front board 121 and the back board 20 could be fixed and the circuit board 32 of the electrical component 30 could be fixed between the front board 121 and the back board 20. In other embodiments, when the electrical component 30 had been fixed inside the front cover 12, the screw holes could be disposed on the circuit board 32; each of the screws 26A is directly screwed with each of the screw holes of the circuit board 32, so that the front board 121 and the back board 20 could be fixed and the circuit board 32 of the electrical component 30 could be fixed between the front board 121 and the back board 20. In other embodiments, each of the screws 26A could be directly screwed with each of the screw holes 14 of the front board 121, so that the front board 121 and the back board 20 could also be fixed; at that time, the electrical component 30 could selectively be installed in the wall-hanging housing 100; when the electrical component 30 is installed in the wall-hanging housing 100, a location in which the electrical component 30 is disposed need to avoid the circular tube bodies 241A and the screws 26A, so that the screws 26A could be directly screwed with the screw holes 14 of the front board 121.

In addition to the housing rooms 22A, which are the rectangle recesses, formed in the four corners of the back surface BS of the back board 20 of the embodiment, the housing rooms 22A, which are the rectangle recesses, could be also formed in three different locations of the back surface BS, two locations of the back surface BS, or one location of the back surface BS, so that the hanging opening 222A of each of the housing rooms 22A could be also used to hang on the support hook and the dent 223A of each of the housing rooms 22A could be used to hang on the screw head. In addition to each of the housing rooms 22A having the three hanging openings 222A located on the three sides of the peripheral wall 221A, four hanging openings 222A, four dents 223A, and four blocking sheets 224A could also be disposed on four sides of the peripheral wall 221A. In this way, the hanging openings 222A in different directions could be chosen to hang on the support hooks or the dents 223A in different directions could be chosen to hang on the screw head, thereby the box body 10 could hang on the same support hook or the same screw head in different directions, thereby achieving the purpose of flexibly hanging the box body 10 of the wall-hanging housing 100.

Figure 5:
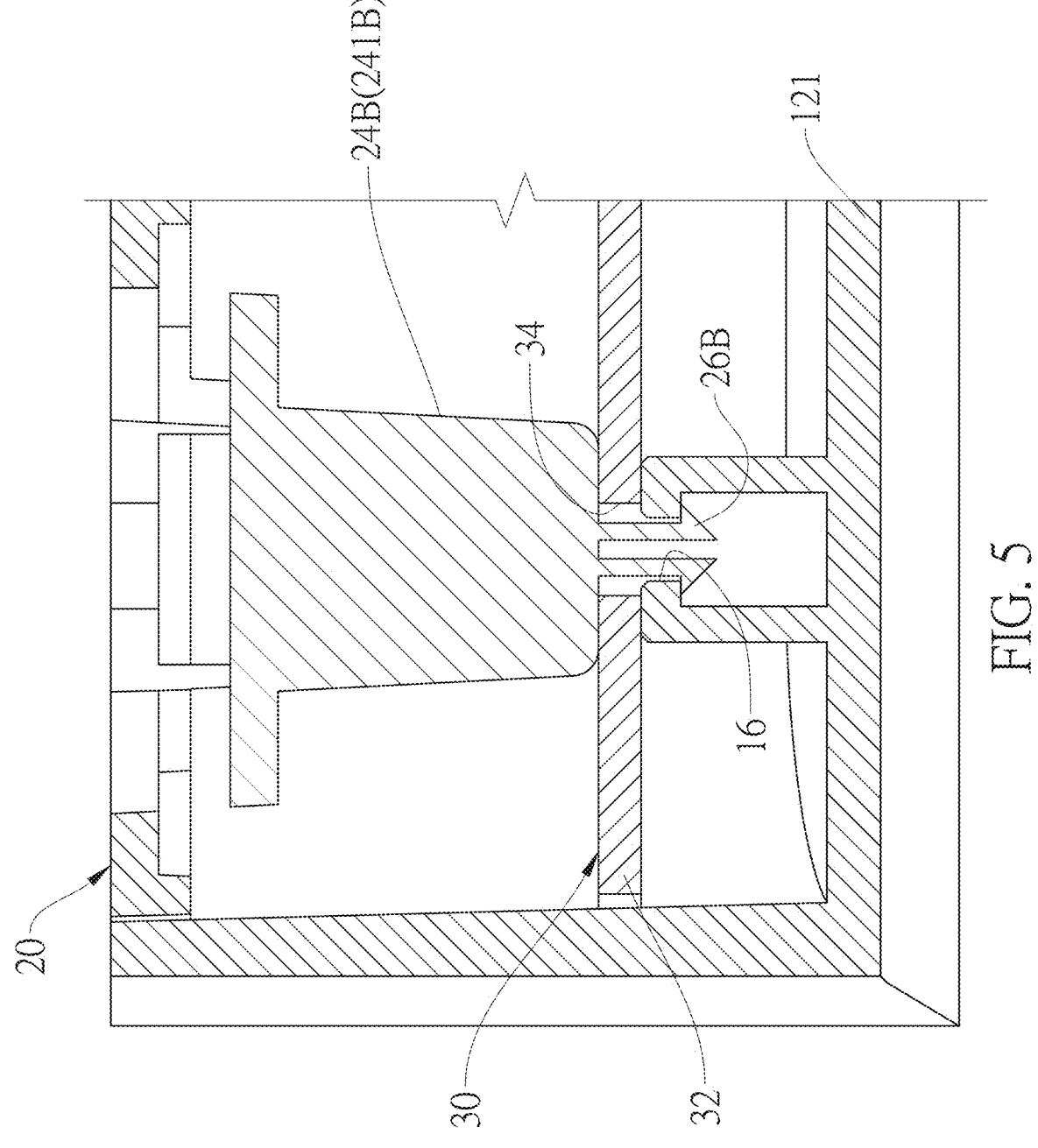
FIG. 5 is a sectional schematic view showing the housing room according to the embodiment of the present disclosure.

In the aforementioned embodiment, the convex portions 24A are combined with the front board 121 and the circuit board 32 of the electrical component 30 through screwing. Referring to FIG. 5, in another embodiment, a convex portion 24B could be combined with the front board 121 and the circuit board 32 of the electrical component 30 through buckling. More specifically, the convex portion 24B is a rod body 241B, wherein the rod body 241B has a fixing buckle 26B. A buckling hole 16 matching with the fixing buckle 26B is disposed on the front board 121. A through hole 34 is disposed on the circuit board 32 of the electrical component 30. The fixing buckle 26B penetrates through the through hole 34 of the circuit board 32 and thereby is buckled in the buckling hole 16 of the front board 121, so that the front board 121 and the back board 20 could be fixed and the circuit board 32 of the electrical component 30 could be fixed between the front board 121 and the back board 20. In other embodiments, the front cover 12 could be replaced with the front board 121; similarly, through the screws 26A screwed with each of the screw holes 14 of the front board 121, the front board 121 and the back board 20 could be fixed and the circuit board 32 of the electrical component 30 could be fixed between the front board 121 and the back board 20. In other embodiments, when the electrical component 30 had been fixed inside the front cover 12, the buckling hole could also be disposed on the circuit board 32 and the fixing buckle 26B could be directly buckled in the buckling hole of the circuit board 32, so that the front board 121 and the back board 20 could be fixed and the circuit board 32 of the electrical component 30 could be fixed between the front board 121 and the back board 20. In other embodiments, the fixing buckle 26B could be directly buckled in the front board 121, so that the front board 121 and the back board 20 could also be fixed.

Figure 1C:
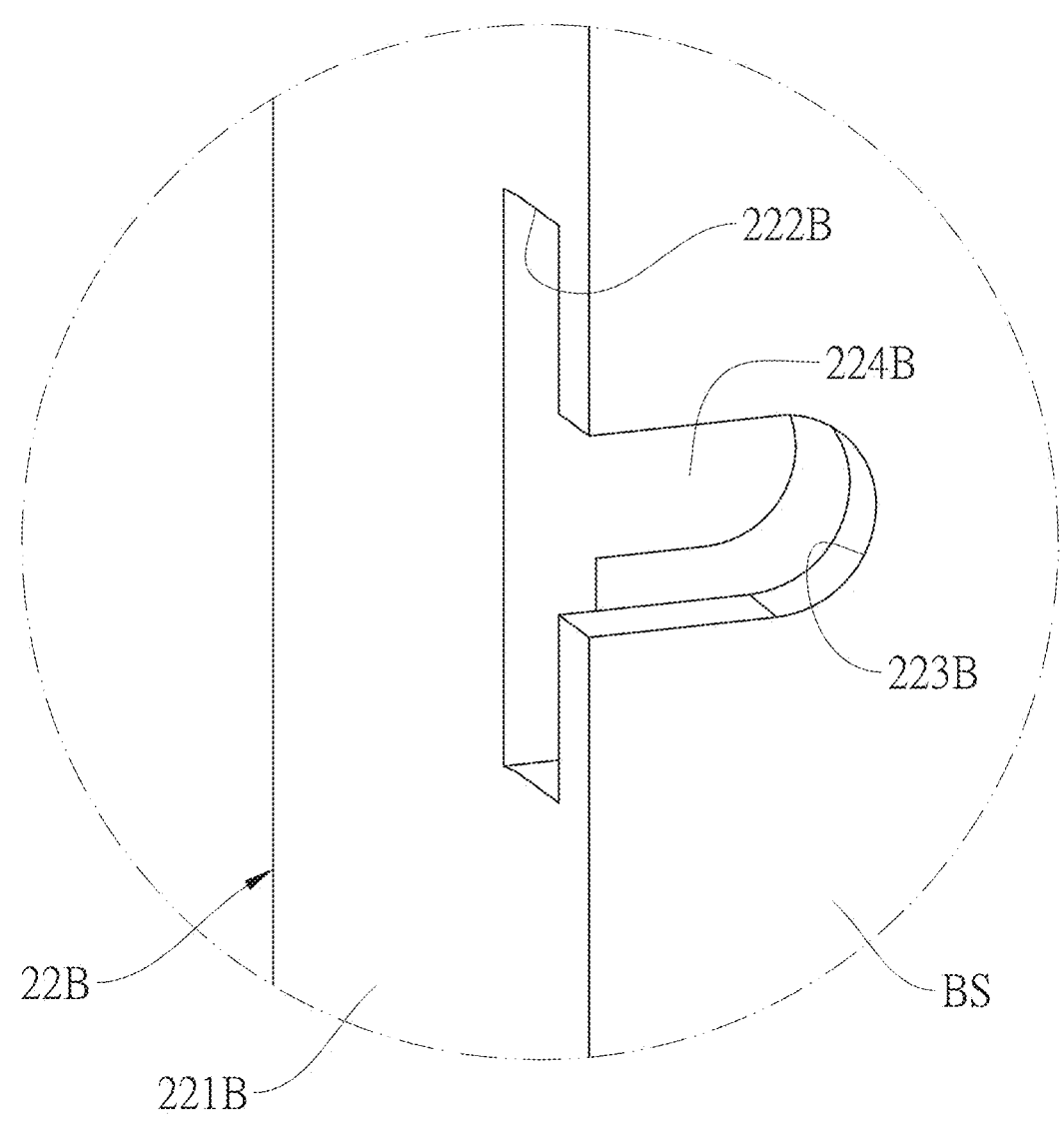
FIG. 1C is an enlarged view of a marked region 1C in FIG. 1A.
Figure 2A:
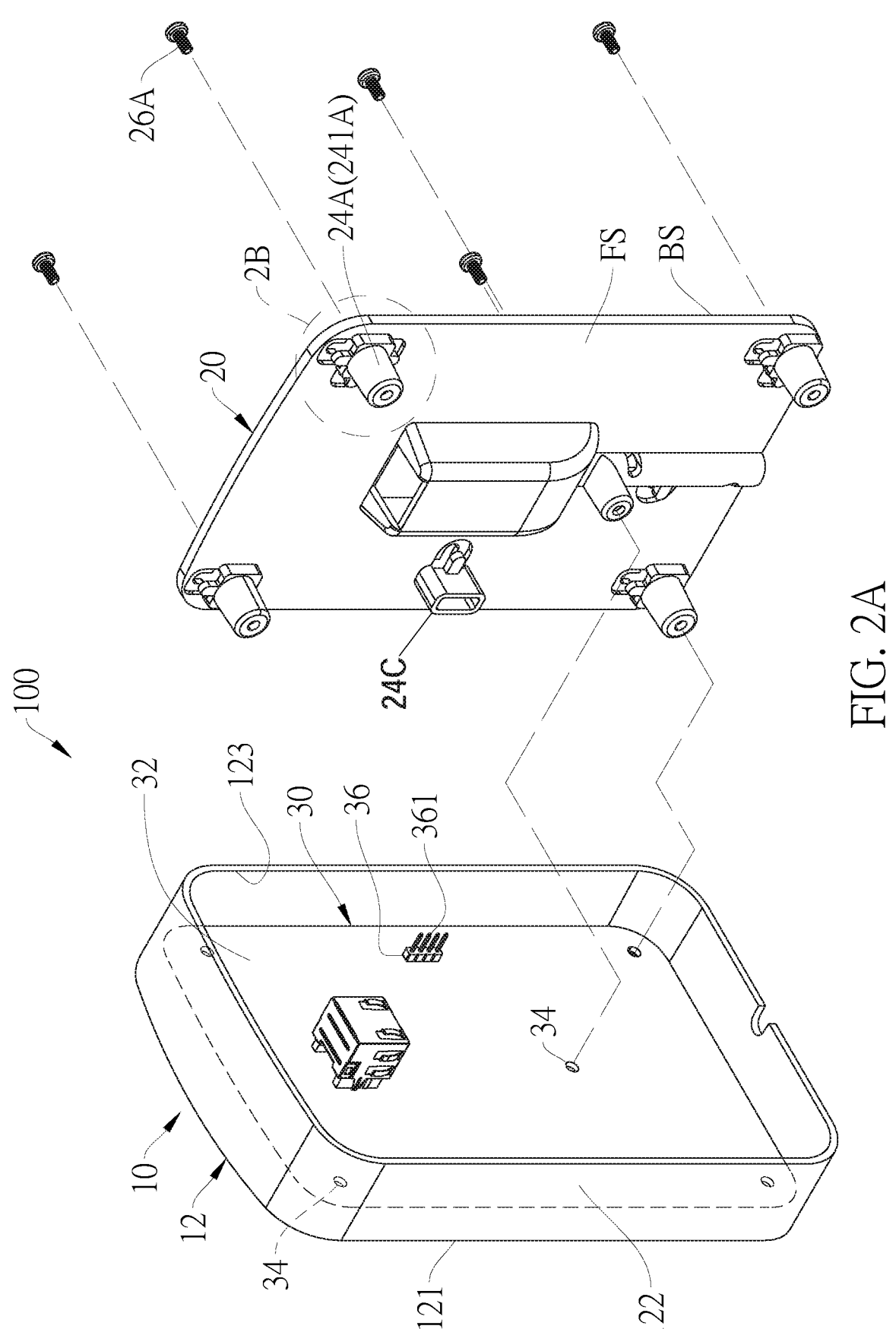
FIG. 2A is an exploded view of the wall-hanging housing for the electronic device according to the embodiment of the present disclosure.
Figure 2B:
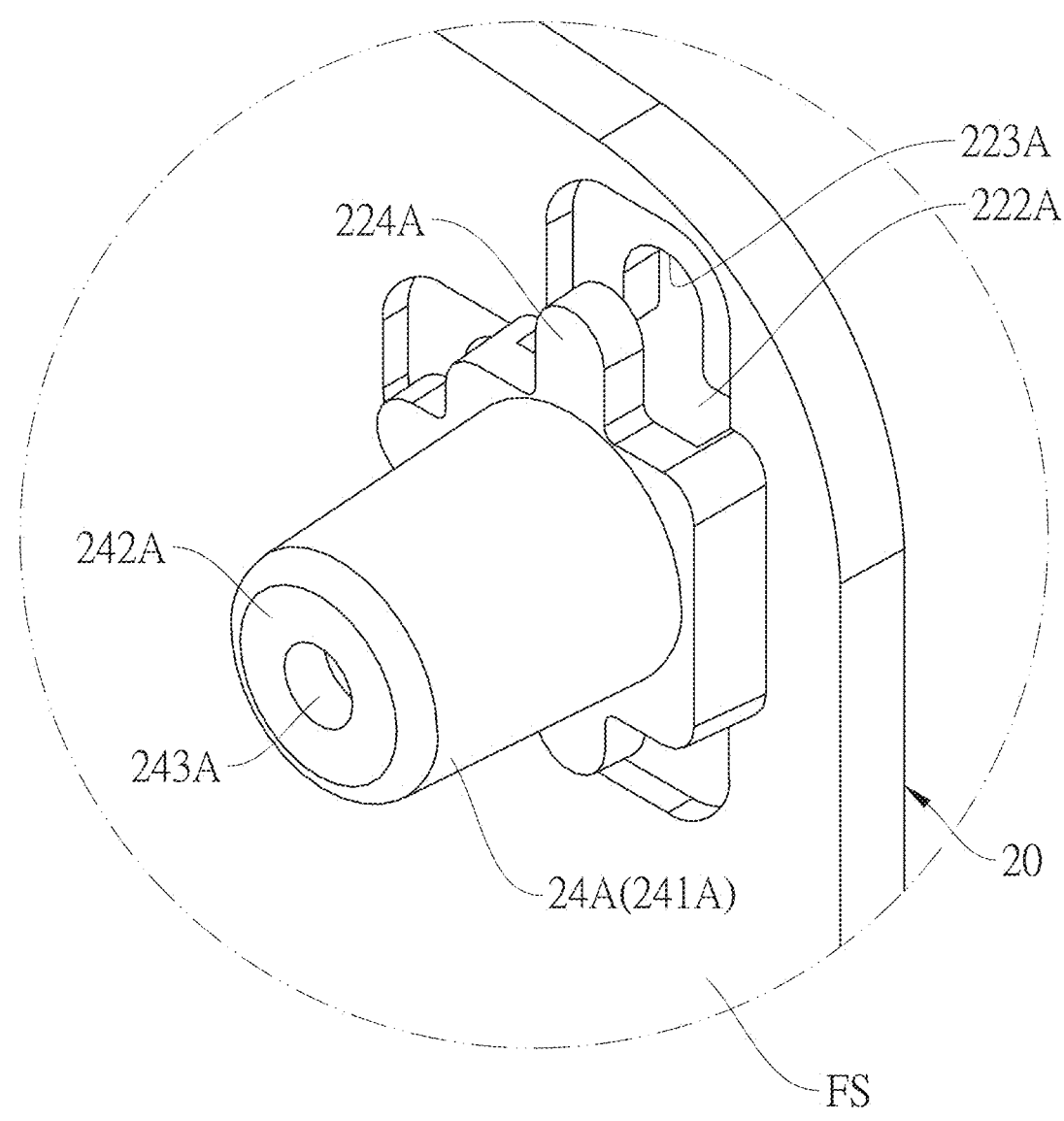
FIG. 2B is an enlarged view of a marked region 2B in FIG. 2A.
Figure 3:
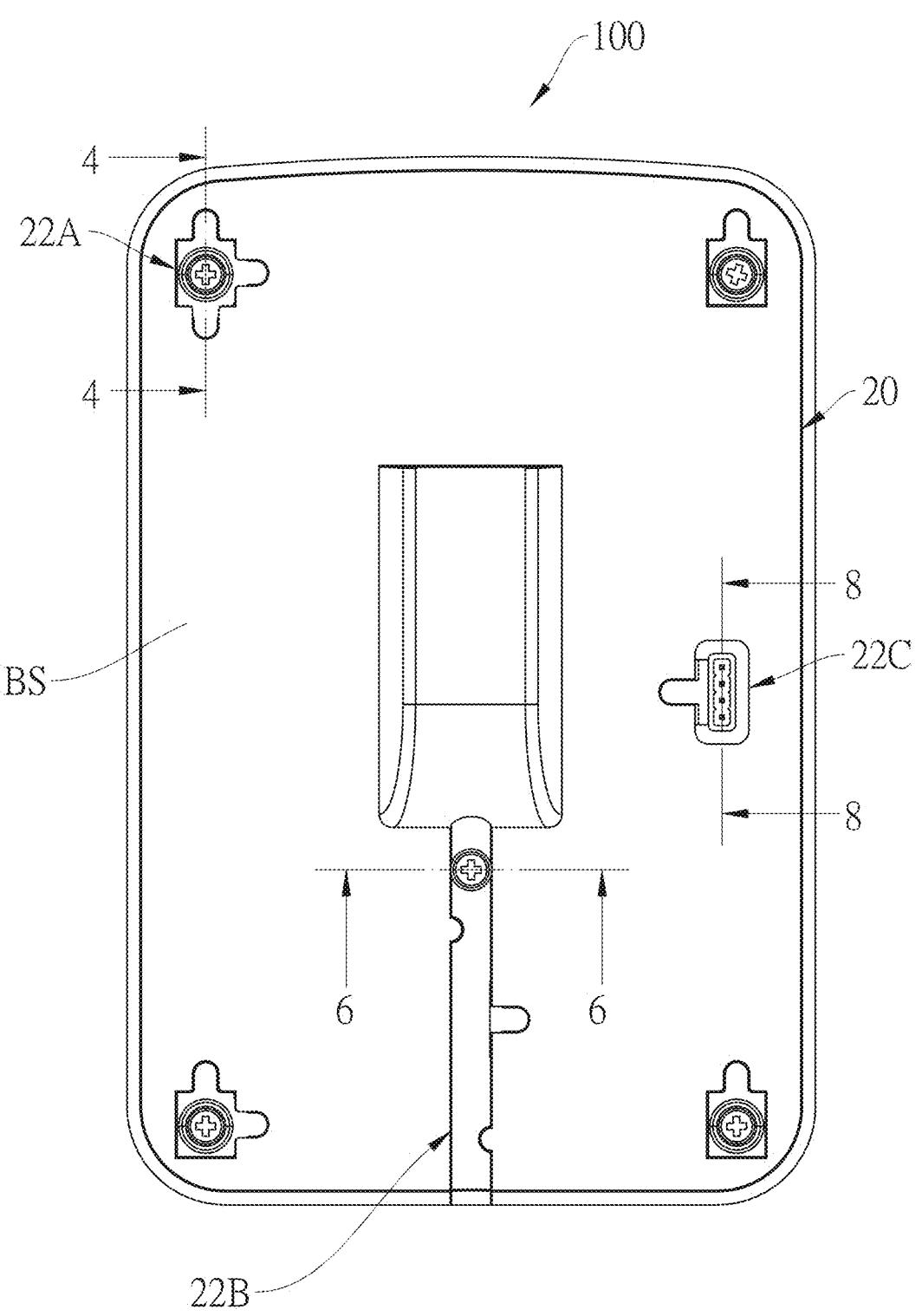
FIG. 3 is a rear view of the wall-hanging housing for the electronic device according to the embodiment of the present disclosure.
Figure 4:
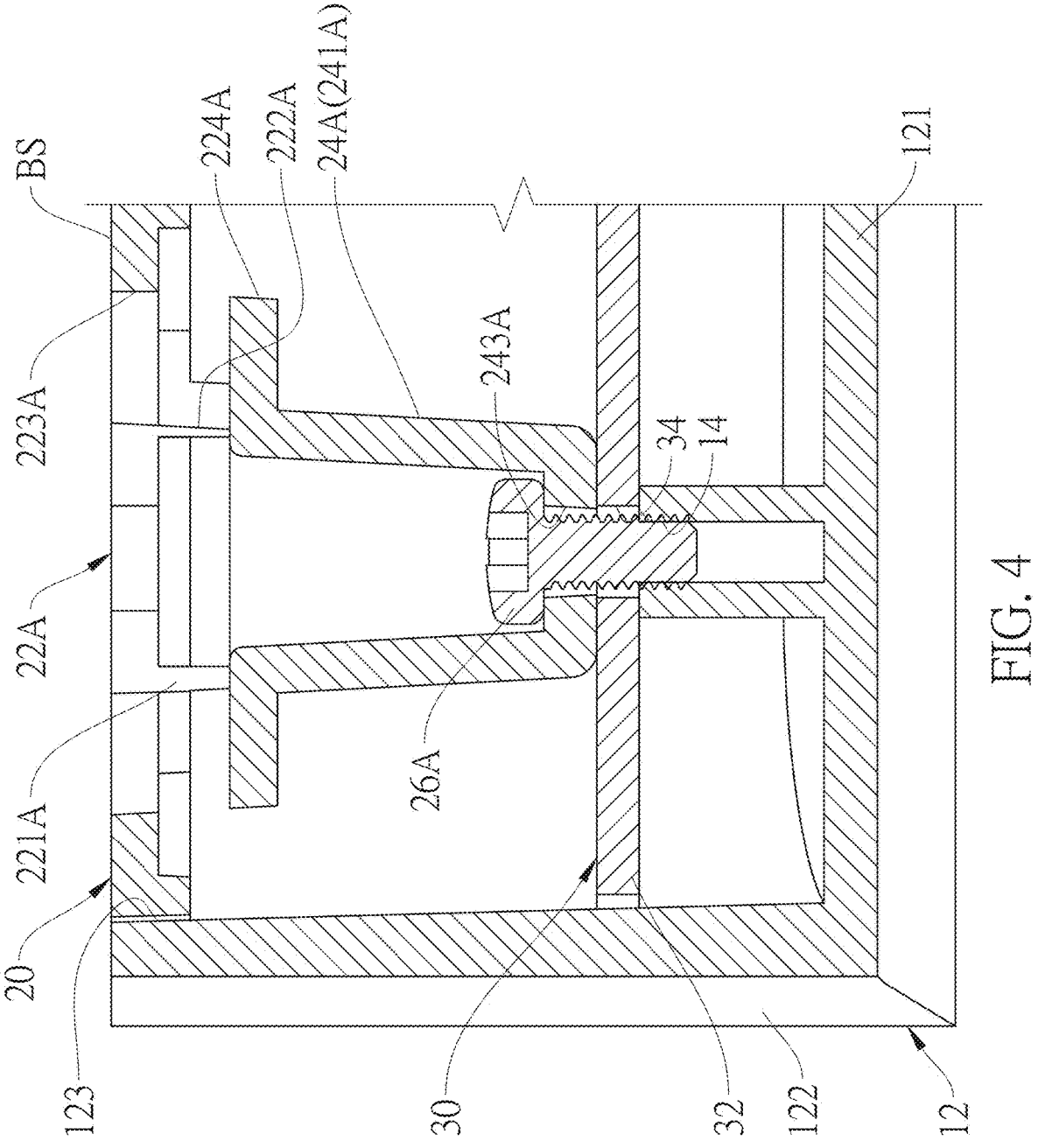
FIG. 4 is a sectional view along the 4-4 line in FIG. 3.
Figure 6:
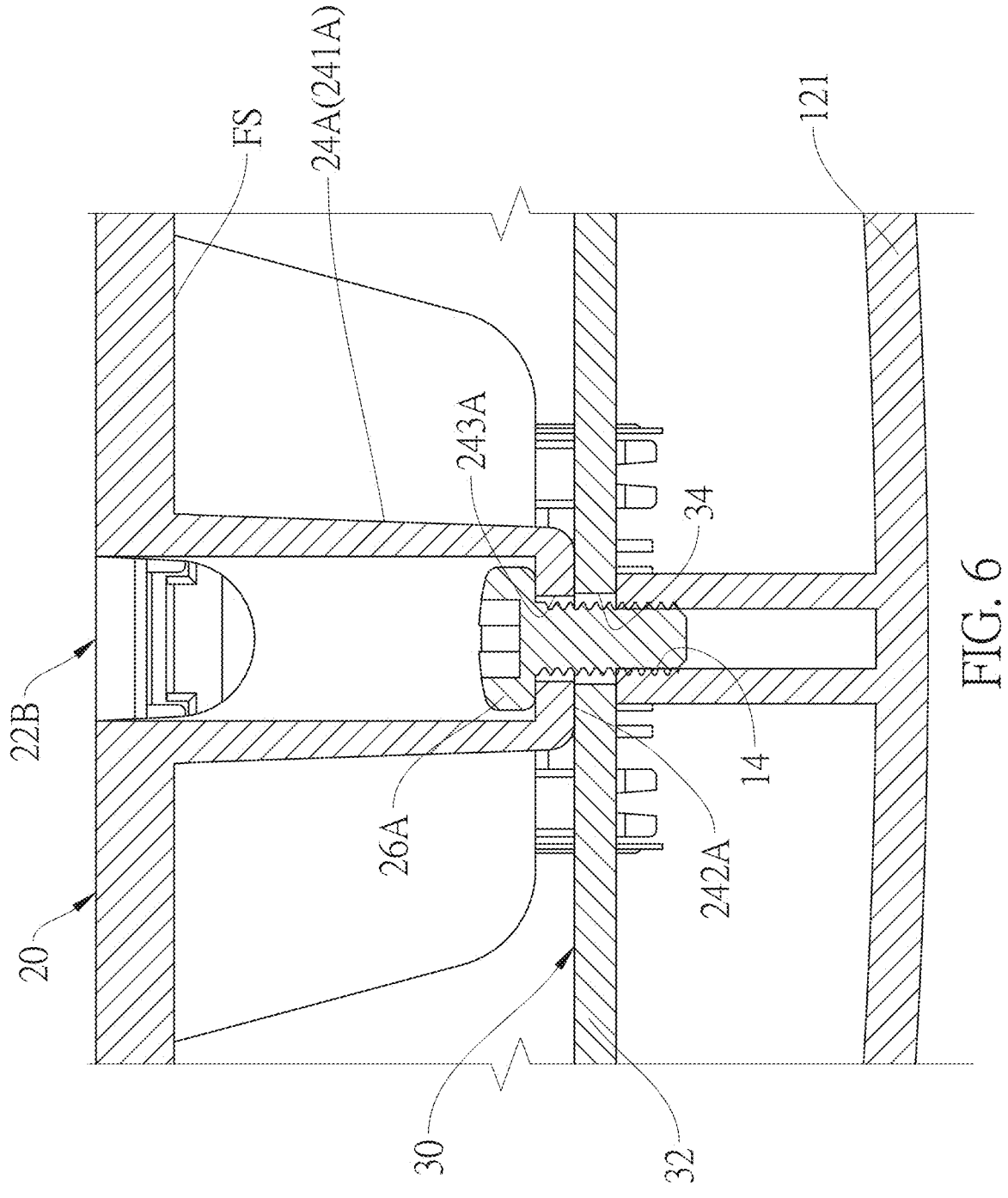
FIG. 6 is a sectional view along the 6-6 line in FIG. 3.

Referring to FIG. 1A, FIG. 1C, and FIG. 6, the housing room 22B is formed in a center of the back surface BS, is a long trench extending in a straight-line direction, and has an inner wall 221B that is U-shaped. More specifically, the housing room 22B could be a cable management slot. When the housing room 22B extends to other ports, such as a power port or an internet port, of the back board 20, a space of the extending long trench of the housing room 22B has a function of storing and fixing a related cable. A part of the inner wall 221B connected to the back surface BS is connected to a convex sheet 225B, which is adapted to press the cable stored in the housing room 22B. A side of the inner wall 221B has a hanging opening 222B, wherein the hanging opening 222B could hang on the support hook. A dent 223B corresponding to the hanging opening 222B is formed on a side of a back edge of the long trench of the housing room 22B. In the current embodiment, the dent 223B is U-shaped. A part of the hanging opening 222B connected to the front surface FS is connected to a blocking sheet 224B, wherein the blocking sheet 224B and the dent 223B face each other, so that the dent 223B could hang on the support hook, the screw head, or other corresponding fixing devices.

A part of the front surface FS of the back board 20 corresponding to the housing room 22B is also connected to a convex portion 24A, wherein the convex portion 24A extends in the direction of the front board 121 and the circuit board 32 of the electrical component 30. In the current embodiment, the convex portion 24A is combined with the front board 121 and the circuit board 32 of the electrical component 30. More specifically, the convex portion 24A is a circular tube body 241A, wherein the circular tube body 241A has a tail end 242A. A center of the tail end 242A has a through hole 243A. A screw 26A penetrates through the through hole 243A. A screw hole 14 matching with the screw 26A is disposed on the front board 121. A through hole 34 is disposed on the circuit board 32 of the electrical component 30. The screw 26A penetrates through the through hole 34 of the circuit board 32 to be screwed with the screw hole 14 of the front board 121, so that the front board 121 and the back board 20 could be fixed and the circuit board 32 of the electrical component 30 could be fixed between the front board 121 and the back board 20. Configurations of other embodiments are similar to the configurations of the aforementioned and is not repeated here.

Figure 7A:
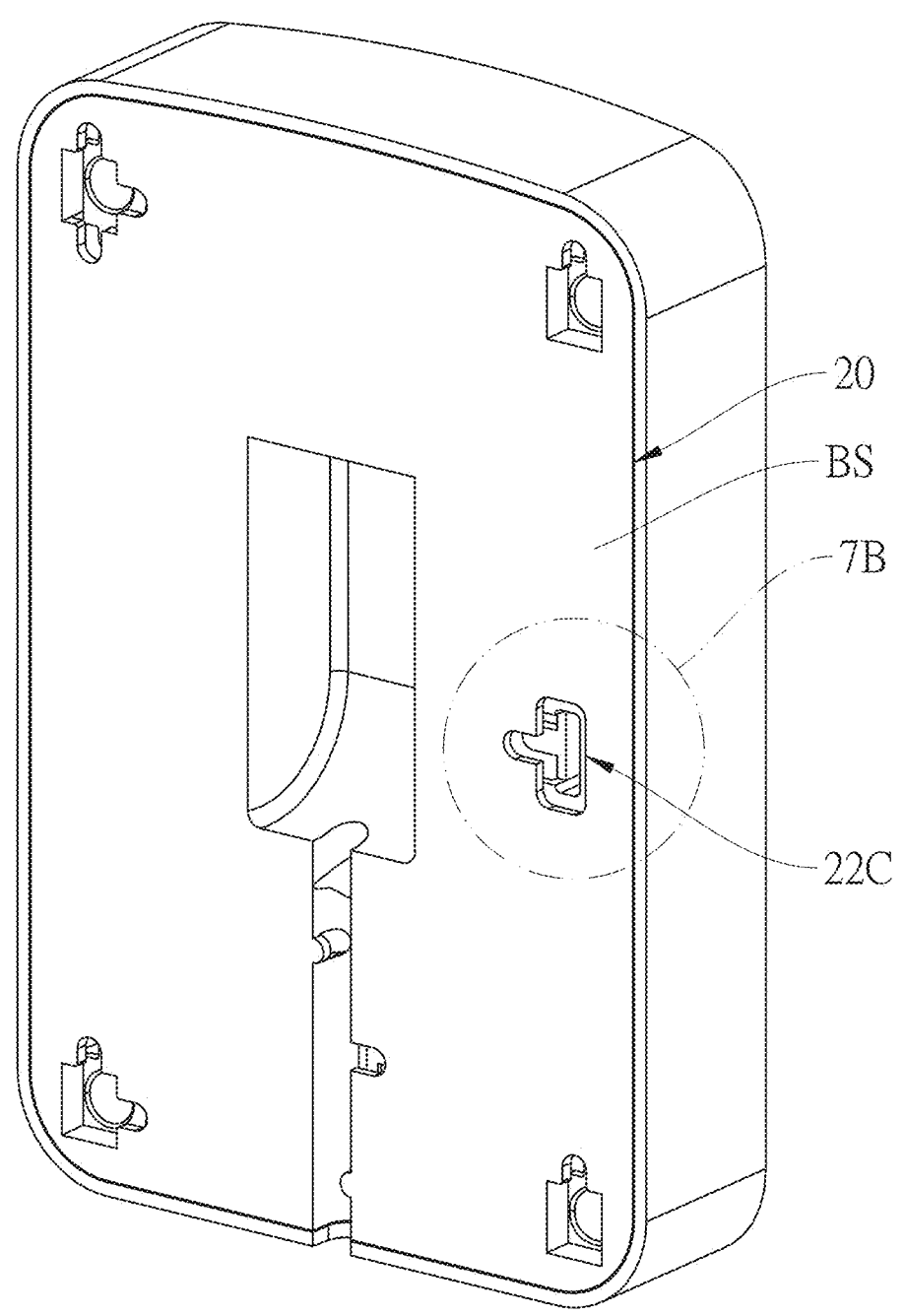
FIG. 7A is a perspective view of the wall-hanging housing for the electronic device according to the embodiment of the present disclosure seen from another direction.
Figure 7B:
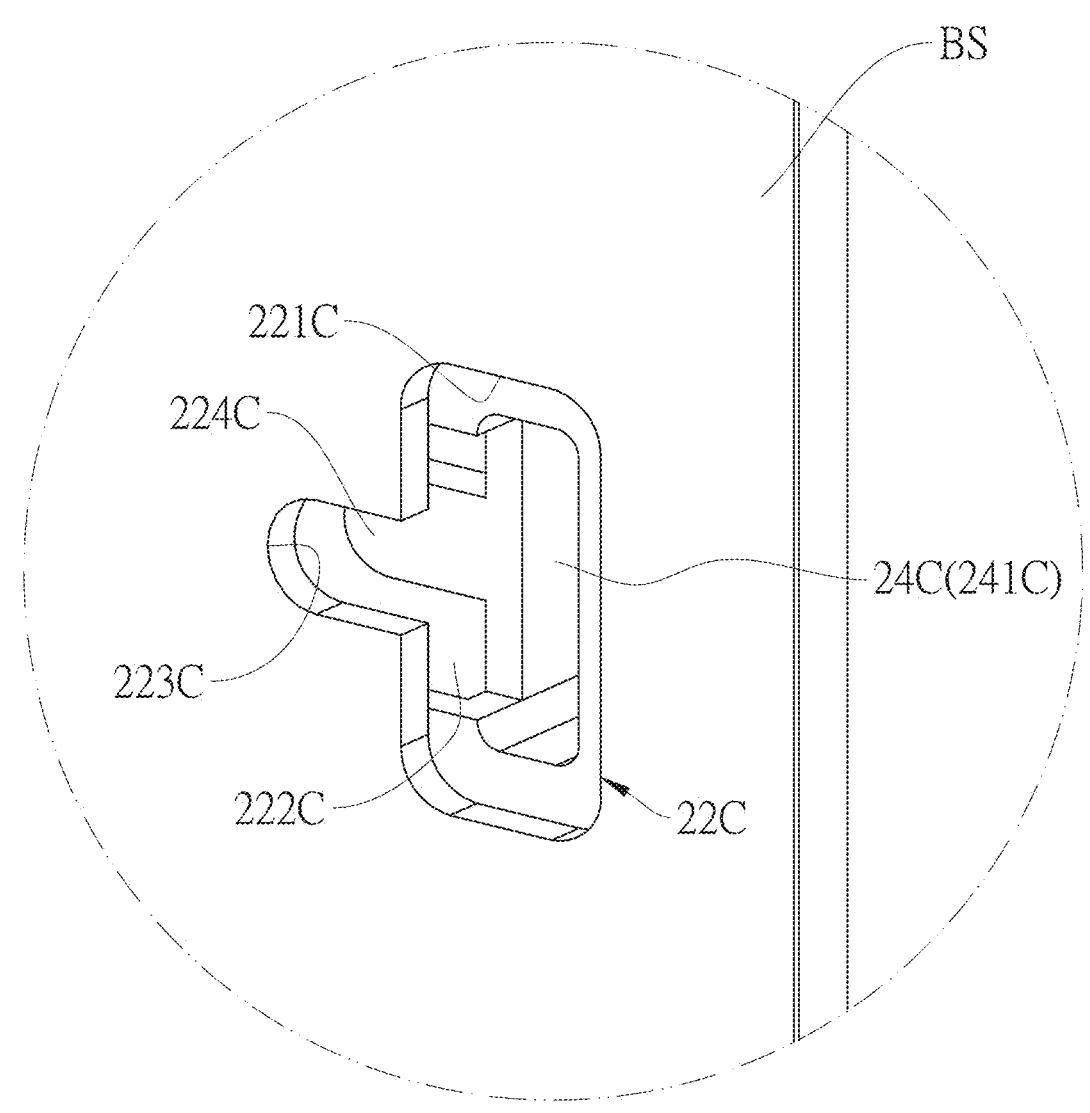
FIG. 7B is an enlarged view of a marked region 7B in FIG. 7A.
Figure 8:
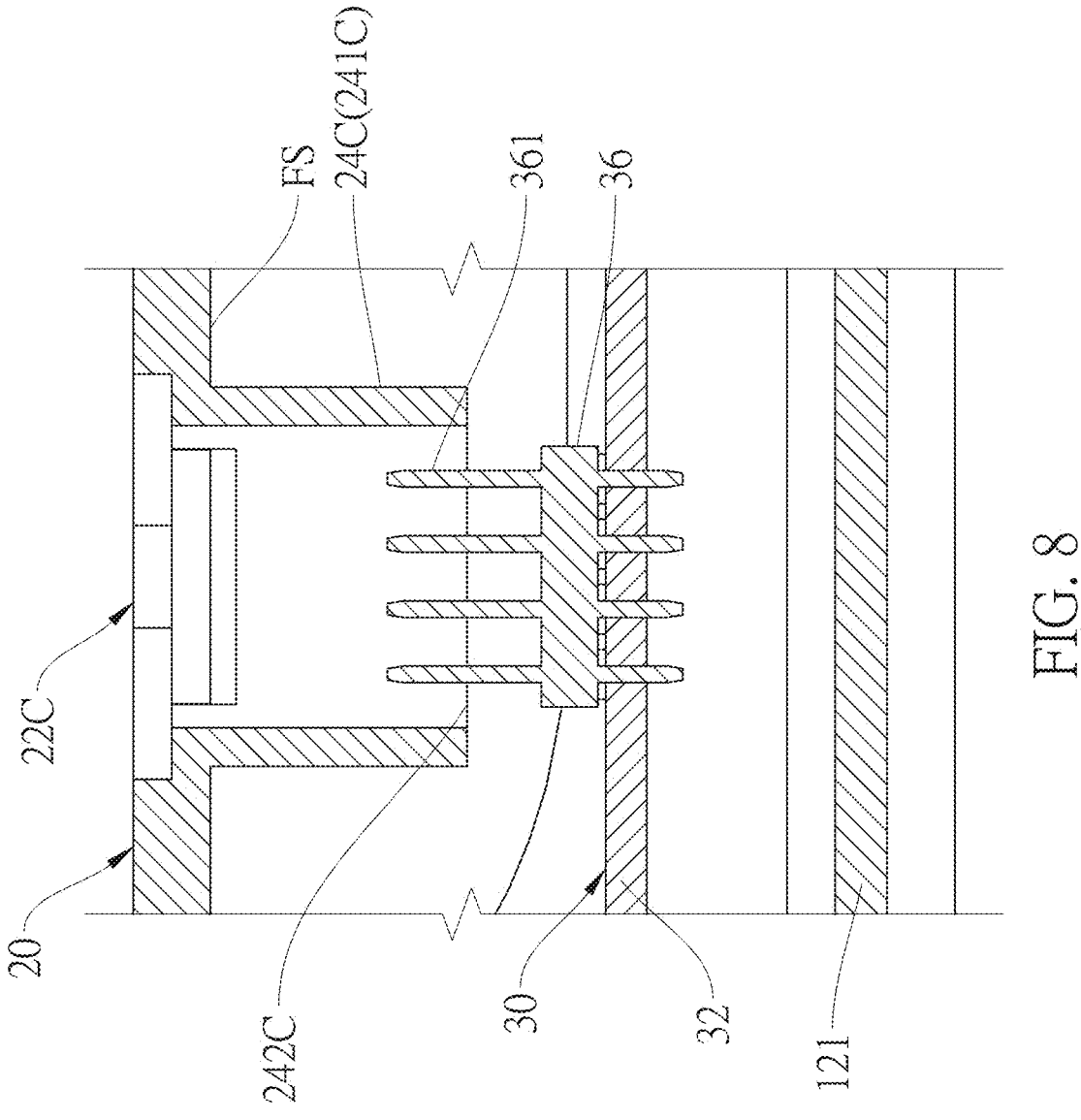
FIG. 8 is a sectional view along the 8-8 line in FIG. 3.

Referring to FIG. 7A to FIG. 8, the housing room 22C is formed on a side of the back surface BS. A periphery of the housing room 22C has a peripheral wall 221C, wherein the peripheral wall 221C is a surface surrounding as a rectangle, but not limited thereto. A side of the peripheral wall 221C has a hanging opening 222C, wherein the hanging opening 222C could hang on the support hook. A dent 223C corresponding to the hanging opening 222C is formed on a side of a peripheral edge of the housing room 22C. In the current embodiment, the dent 223C is U-shaped; a part of the hanging opening 222C connected to the front surface FS is connected to a blocking sheet 224C, wherein the blocking sheet 224C and the dent 223C face each other, so that the dent 223C could hang on the screw head.

A part of the front surface FS of the back board 20 corresponding to the housing room 22C is connected to a convex portion 24C. A tail end of the convex portion 24C extends in the direction of the front board 121 and the circuit board 32 of the electrical component 30. In the current embodiment, the convex portion 24C is a rectangular tube body 241C. A connecting port 36 matching with the rectangular tube body 241C is disposed in the circuit board 32 of the electrical component 30. The connecting port 36 could be a pin base having a plurality of pins 361 or an electrical port electrically connected to other electrical components on the circuit board 32, but not limited thereto. An inner portion of the rectangular tube body 241C communicates with the housing room 22C. The rectangular tube body 241C has an opening 242C, wherein the opening 242C faces the pins 361 of the connecting port 36. In the current embodiment, the opening 242C surrounds a periphery of the pins 36. The rectangular tube body 241C could be inserted by an outside plug or a probe, so that the plug is electrically connected to the connecting port 36 of the electrical component 30. In this way, the electrical component 30 could be detected without removing the back board 20.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A wall-hanging housing for an electronic device, comprising a front board and a back board that face each other; a side of the back board facing the front board has a front surface and another side of the back board away from the front board has a back surface; the back surface is dented in a direction of the front surface to format least one housing room; a part of the front surface corresponding to the at least one housing room is connected to at least one convex portion; the at least one convex portion extends in a direction of the front board; an electrical component is installed in a box body formed by the front board and the back board; the at least one convex portion comprises a rectangular tube body, wherein the rectangular tube body has an opening; an inner portion of the rectangular tube body communicates with the at least one housing room; a connecting port corresponding to the rectangular tube body is disposed on the electrical component; the opening of the rectangular tube body faces the connecting port.

2. A wall-hanging housing for an electronic device, comprising a front board and a back board that face each other; a side of the back board facing the front board has a front surface and another side of the back board away from the front board has a back surface; the back surface is dented in a direction of the front surface to format least one housing room; a part of the front surface corresponding to the at least one housing room is connected to at least one convex portion; the at least one convex portion extends in a direction of the front board; an electrical component is installed in a box body formed by the front board and the back board; the at least one convex portion is adapted to be combined with the front board or the electrical component; the at least one convex portion comprises a circular tube body; the circular tube body has a tail end; a center of the tail end has a through hole; a screw penetrates through the through hole; a screw hole matching with the screw is disposed on the front board or on the electrical component; the screw is screwed with the screw hole of the front board or with the screw hole of the electrical component.

3. A wall-hanging housing for an electronic device, comprising a front board and a back board that face each other; a side of the back board facing the front board has a front surface and another side of the back board away from the front board has a back surface; the back surface is dented in a direction of the front surface to format least one housing room; a part of the front surface corresponding to the at least one housing room is connected to at least one convex portion; the at least one convex portion extends in a direction of the front board; an electrical component is installed in a box body formed by the front board and the back board; the at least one convex portion is adapted to be combined with the front board or the electrical component; the at least one convex portion comprises a rod body; the rod body has a fixing buckle; a buckling hole matching with the fixing buckle is disposed on the front board or on the electrical component; the fixing buckle is buckled in the buckling hole of the front board or in the buckling hole of the electrical component.

4. A wall-hanging housing for an electronic device, comprising a front board and a back board that face each other; a side of the back board facing the front board has a front surface and another side of the back board away from the front board has a back surface; the back surface is dented in a direction of the front surface to format least one housing room; a part of the front surface corresponding to the at least one housing room is connected to at least one convex portion; the at least one convex portion extends in a direction of the front board; an electrical component is installed in a box body formed by the front board and the back board; the at least one convex portion is adapted to be combined with the front board or the electrical component; the at least one housing room has a peripheral wall; at least one side of the peripheral wall has a hanging opening; a dent corresponding to the hanging opening of the at least one side of the peripheral wall is formed on a side of a peripheral edge of the at least one housing room; a part of the hanging opening, which is connected to the front surface, of the at least one side of the peripheral wall is connected to a blocking sheet, wherein the blocking sheet and the dent face each other.

5. The wall-hanging housing as claimed in claim 4, wherein the at least one housing room is at least one rectangular recess; the peripheral wall is a surface surrounding as a rectangle.

6. A wall-hanging housing for an electronic device, comprising a front board and a back board that face each other; a side of the back board facing the front board has a front surface and another side of the back board away from the front board has a back surface; the back surface is dented in a direction of the front surface to format least one housing room; a part of the front surface corresponding to the at least one housing room is connected to at least one convex portion; the at least one convex portion extends in a direction of the front board; an electrical component is installed in a box body formed by the front board and the back board; the at least one convex portion is adapted to be combined with the front board or the electrical component; the at least one housing room comprises a long trench extending in a straight-line direction and having an inner wall; a side of the inner wall has a hanging opening; a dent corresponding to the hanging opening is formed on a side of a back edge of the long trench; a part of the hanging opening connected to the front surface is connected to a blocking sheet, wherein the blocking sheet and the dent face each other.

7. The wall-hanging housing as claimed in claim 6, wherein a part of the inner wall connected to the back surface is connected to a convex sheet.

\* \* \* \* \*